(12) United States Patent
Yan et al.

(10) Patent No.: US 9,712,224 B2
(45) Date of Patent: Jul. 18, 2017

(54) ANTENNA SWITCHING FOR DUAL RADIO DEVICES

(71) Applicant: QUALCOMM Incorporated, San Diego, CA (US)

(72) Inventors: Hongbo Yan, Vista, CA (US); Francis M. Ngai, Louisville, CO (US); Jafar Mohseni, San Diego, CA (US); Daniel Fred Filipovic, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 14/015,298

(22) Filed: Aug. 30, 2013

(65) Prior Publication Data

US 2015/0065073 A1    Mar. 5, 2015

(51) Int. Cl.
*H04B 1/06* (2006.01)
*H04B 7/00* (2006.01)
*H04B 7/08* (2006.01)
*H04B 7/06* (2006.01)

(52) U.S. Cl.
CPC ......... *H04B 7/0868* (2013.01); *H04B 7/0602* (2013.01); *H04B 7/0817* (2013.01)

(58) Field of Classification Search
USPC ....... 455/132–141, 226.1–226.4, 272–279.1, 455/552.1, 553.1
See application file for complete search history.

(56) References Cited

U.S. PATENT DOCUMENTS

| | | | | |
|---|---|---|---|---|
| 7,471,702 B2* | 12/2008 | Laroia | ............. | H04L 5/0044 370/208 |
| 7,991,429 B2* | 8/2011 | Chiu | ............. | H01Q 1/2275 455/552.1 |
| 8,565,152 B2* | 10/2013 | Kim | ............. | H04B 1/0064 370/297 |

(Continued)

FOREIGN PATENT DOCUMENTS

| | | |
|---|---|---|
| EP | 2515593 A2 | 10/2012 |
| WO | 03073645 A1 | 9/2003 |
| WO | 2011085187 A2 | 7/2011 |

OTHER PUBLICATIONS

International Search Report and Written Opinion—PCT/US2014/053309—ISA/EPO—Nov. 14, 2014.

*Primary Examiner* — Edward Urban
*Assistant Examiner* — Rui Hu
(74) *Attorney, Agent, or Firm* — Michael J. DeHaemer, Jr.

(57) ABSTRACT

Systems and methods for antenna selection in a wireless terminal with two radios are provided. Signals received using first and second antennas are demodulated by first and second modems according to first and second protocols. A receive path between the second antenna and the second modem can be controlled to receive signals according to the first protocol. A performance measure of demodulating, according to the first protocol, a signal received using the second antenna is determined. The performance measure may be determined using a mirror module in the second modem or using a search module in the first modem. The wireless terminal switches antennas so that the first modem demodulates a signal received using the second antenna, if the performance measure for using the second antenna is such that the switch would improve performance of the first modem.

11 Claims, 2 Drawing Sheets

(56) References Cited

U.S. PATENT DOCUMENTS

| | | | | |
|---|---|---|---|---|
| 8,615,270 | B2* | 12/2013 | Ibrahim | H01Q 21/29 370/338 |
| 2004/0053526 | A1* | 3/2004 | Godfrey | H04B 7/0805 439/188 |
| 2006/0073829 | A1* | 4/2006 | Cho | H04W 36/14 455/439 |
| 2006/0135195 | A1* | 6/2006 | Leinonen | H04B 1/0057 455/550.1 |
| 2006/0276132 | A1* | 12/2006 | Sheng-Fuh | H04B 1/48 455/41.2 |
| 2007/0066244 | A1* | 3/2007 | Kao | H04B 7/0808 455/78 |
| 2007/0178839 | A1* | 8/2007 | Rezvani | H04B 7/0874 455/62 |
| 2010/0022192 | A1* | 1/2010 | Knudsen | H04B 7/0608 455/70 |
| 2010/0296419 | A1* | 11/2010 | Kim | H04B 1/0064 370/297 |
| 2012/0115553 | A1* | 5/2012 | Mahe | H04B 7/0825 455/575.7 |
| 2012/0184228 | A1 | 7/2012 | Mujtaba et al. | |
| 2012/0281553 | A1* | 11/2012 | Mujtaba | H04M 1/72519 370/252 |
| 2013/0017797 | A1 | 1/2013 | Ramasamy et al. | |
| 2013/0033996 | A1* | 2/2013 | Song | H04B 7/0808 370/252 |
| 2013/0142054 | A1 | 6/2013 | Ahmadi | |
| 2013/0178203 | A1* | 7/2013 | Venkataraman | H04W 4/16 455/423 |
| 2013/0309982 | A1* | 11/2013 | Yan | H04B 7/0608 455/79 |
| 2015/0056936 | A1* | 2/2015 | Rangarajan | H03G 3/3078 455/140 |

* cited by examiner

ANTENNA SWITCHING FOR DUAL RADIO DEVICES

BACKGROUND

Field

Aspects of the present disclosure relate generally to wireless communication and, more particularly, to antenna selection in a wireless terminal with two radios.

Background

A wireless terminal, for example, a mobile phone, may include multiple radios and multiple antennas. The communication channels to and from the antennas can vary greatly. For example, when a user holds a mobile phone, one antenna may be blocked by the user's hand while another antenna is substantially open. When the mobile phone uses the blocked antenna for communications, there may be, for example, a 10-30 dB attenuation relative to when the unblocked antenna is used. Thus, a wireless terminal may improve performance by switching the antenna that is used away from a blocked antenna.

A wireless terminal may also provide concurrent communications for two protocols, for example, in dual-SIM, dual-active (DSDA) or simultaneous voice and long term evolution (SVLTE) systems. Each of the protocols may be processed by a particular one of the radios. The communication channels for the protocols may differ (for example, depending on the distance to the respective base stations) in such a way that one allocation of antennas provides reliable communication for both protocols but when the antennas are switched, reliable communication for one of the protocols is not achieved.

Antenna selection can be performed by detecting that performance of a radio is degraded and then switching antennas. However, switching to a different antenna may not result in improved performance. Additionally, communications to the wireless terminal are interrupted when the antennas are switched.

SUMMARY

Systems and methods that perform antenna selection in a radio receiver with two radios are provided. The antenna selection systems and methods can be used, for example, in a wireless terminal such as a mobile phone. The disclosed antenna selection can provide improved performance.

In one aspect, a circuit for use in a wireless terminal that is switchable between receiving a first received signal using a first antenna and a second received signal using a second antenna and receiving the first received signal using the second antenna and the second received signal using the first antenna is provided. The circuit comprises a first modem module configured to demodulate the first received signal according to a first protocol and to determine a first performance measure of demodulating the first received signal according to the first protocol; a second modem module configured to demodulate the second received signal according to a second protocol, the second modem module comprising a mirror module operable to determine a second performance measure of demodulating the second received signal according to the first protocol; and a control module configured to cause the mirror module to determine the second performance measure and to cause a switch of which of the first received signal and the second received signal are received using the first antenna and the second antenna when the first performance measure and the second performance measure are such that the switch would improve performance of demodulating the first received signal in the first modem module.

In one aspect, a circuit for use in a wireless terminal that is switchable between receiving a first received signal using a first antenna and a second received signal using a second antenna and receiving the first received signal using the second antenna and the second received signal using the first antenna is provided. The circuit comprises a first modem module configured to demodulate the first received signal according to a first protocol and to determine a first performance measure of demodulating the first received signal according to the first protocol, the first modem module comprising a search module operable to determine a second performance measure of demodulating the second received signal according to the first protocol; a second modem module configured to demodulate the second received signal according to a second protocol; and a control module configured to cause the search module to determine the second performance measure and to cause a switch of which of the first received signal and the second received signal are received using the first antenna and the second antenna when the first performance measure and the second performance measure are such that the switch would improve performance of demodulating the first received signal in the first modem module.

In one aspect, a method for controlling antenna switching in a wireless terminal that includes a first modem module and a second modem module, the first modem module operable to demodulate a signal received using a first antenna or a second antenna, the second modem module operable to demodulate a signal received using the other one of the first antenna or the second antenna is provided. The method comprises demodulating, using the first modem module, a signal received using the first antenna, the demodulating performed according to a first protocol; determining a first performance measure of demodulating the signal received using the first antenna; demodulating, using the second modem module, a signal received using the second antenna, the demodulating performed according to a second protocol; determining a second performance measure of demodulating a signal received using the second antenna, the second performance measure being for demodulating performed according to the first protocol; determining whether the second performance measure is greater than the first performance measure; and switching, in the case that the second performance measure is greater than the first performance measure, the first modem module to demodulate a signal received using the second antenna.

In one aspect, a circuit for use in a wireless terminal that is switchable between receiving a first received signal using a first antenna and a second received signal using a second antenna and receiving the first received signal using the second antenna and the second received signal using the first antenna is provided. The circuit comprises a means for demodulating the first received signal according to a first protocol and to determine a first performance measure of demodulating the first received signal according to the first protocol; a means for demodulating the second received signal according to a second protocol, the means for demodulating the second received signal comprising a mirror module for determining a second performance measure of demodulating the second received signal according to the first protocol; and a means for controlling operation of the wireless terminal including causing the mirror module to determine the second performance measure and causing a switch of which of the first received signal and the second received signal are received using the first antenna and the second antenna when the second performance measure is greater than the first performance measure.

In one aspect, a circuit for use in a wireless terminal that is switchable between receiving a first received signal using a first antenna and a second received signal using a second received antenna and receiving the first received signal using the second antenna and the second received signal using the first antenna is provided. The circuit comprises a means for demodulating the first received signal according to a first protocol and to determine a first performance measure of demodulating the first received signal according to the first protocol, the means for demodulating the first received signal comprising a search module operable to determine a second performance measure of demodulating the second received signal according to the first protocol; a means for demodulating the second received signal according to a second protocol; and a means for controlling operation of the wireless terminal including causing the search module to determine the second performance measure and causing a switch of which of the first received signal and second received signal are received using the first antenna and the second antenna when the second performance measure is greater than the first performance measure.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Figure 1:
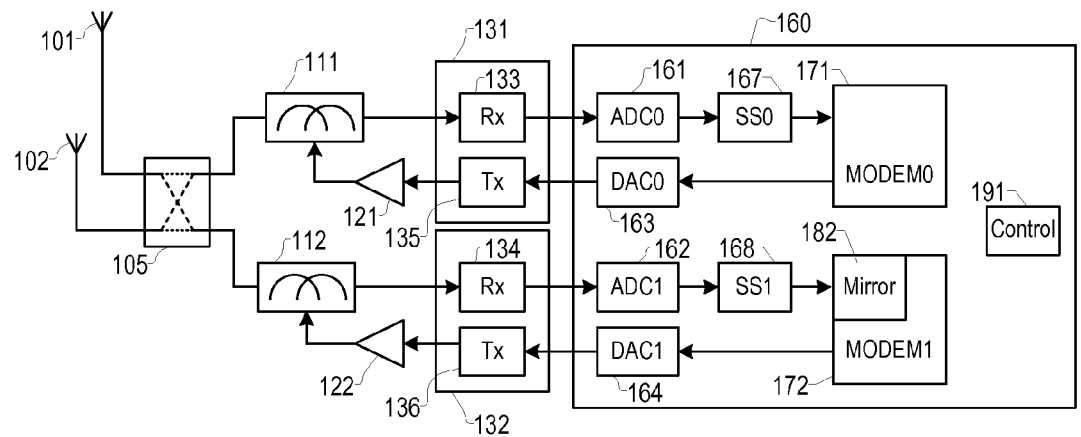
FIG. 1 is functional block diagram of a wireless terminal according to a presently disclosed embodiment.

FIG. 1 is a functional block diagram of a wireless terminal according to a presently disclosed embodiment. The wireless terminal includes a first antenna 101 and a second antenna 102. The first antenna 101 and the second antenna 102 are coupled to a radio frequency (RF) switch 105. The RF switch 105 in the embodiment of FIG. 1 is a double-pole double-throw switch. Other types of switches may also be used, for example, depending on the number of antennas and number of radios used by the wireless terminal. Alternative switch locations and types of switches may also be used. The RF switch 105 can couple the first antenna 101 to a first duplexer 111 and the second antenna 102 to a second duplexer 112, or the RF switch 105 can be switched to couple the first antenna 101 to the second duplexer 112 and the second antenna 102 to the first duplexer 111. The duplexers couple separate transmit and receive signals to the antennas.

The duplexers receive the transmit signals from RF power amplifiers 111, 112. The RF power amplifiers are coupled to RFI transmitter circuits 135, 136. The RF transmitter circuits provide functions for transmitting signals from the wireless terminal, such as up conversion. The duplexers supply the received signals to RF receiver circuits 133, 134. The RF receiver circuits provide functions for receiving signals, such as down conversion. The RF transmitter circuits and RF receiver circuits may be provided by transceiver modules 131, 132.

The RF receiver circuits supply signals to analog-to-digital converters (ADCs) 161, 162. The signals received by the ADCs may be, for example, baseband or intermediate frequency (IF) signals corresponding to signals received by the antennas. Additional circuits, for example, filters, amplifiers, and offset correction circuits, may be included with the ADCs.

The RF transmitter circuits receive signals from digital-to-analog converters (DACs) 163, 164. The signals supplied by the DACs may be, for example, baseband or IF signals corresponding to signals to be transmitted by the antennas. The DACs receive digital signals from modem modules 171, 172 that convert information to be transmitted from the wireless terminal into appropriate formats for transmission. The conversion of information to be transmitted into an appropriate format can be referred to as modulating the information.

Each of the modem modules 171, 172 may be operable to provide communications using a particular protocol (or related protocols). The protocols may be associated with particular communication standards. For example, the first modem module 171 may provide communications according to the GSM protocol and the second modem module 172 may provide communications according to the WCMDA protocol.

The ADCs provide digital signals to the modem modules 171, 172 via sample butters 167, 168. The sample buffers may be used, for example, to facilitate processing of blocks of samples by the modem modules. The modem modules 171, 172 operate to recover digital information in the received signals. The recovery of digital information from a received signal can be referred to as demodulating the signal.

Operation of the modules of the wireless terminal may be controlled by a control module 191. The control module 191 may be, for example, a programmable processor executing software instructions. Additionally control functions may be combined with or distributed across modules. The ADCs. DACs, sample buffers, modem modules, and control module may be combined with other circuits, such as processors, in a system-on-a-chip 160.

The second modem module 172 includes a mirror module 182. The mirror module 182 is able to process received signals according a protocol used by the first modem module 171. Although not shown in the embodiment of FIG. 1, the first modem module 171 may also include a mirror module that is able to process received signals according a protocol used by the second modem module 172.

Figure 2:
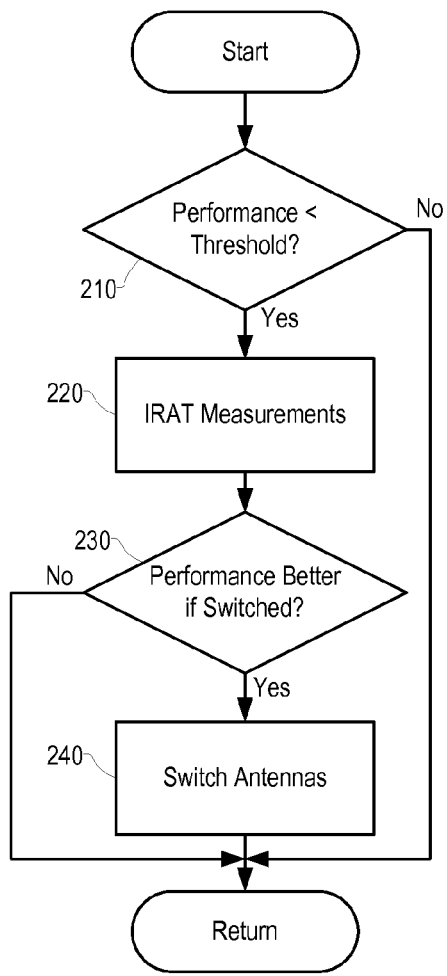
FIG. 2 is a flowchart of a process for antenna selection in a dual-radio device according to a presently disclosed embodiment.

FIG. 2 is a flowchart of a process for antenna selection in a dual-radio device. The process may be carried out, for example, by the wireless terminal of FIG. 1. To provide a specific example, the process will be described with reference to the wireless terminal of FIG. 1. The process makes use of the mirror module 182 and may be controlled by the control module 191.

The first modem module 171, in an example embodiment, has priority. In other embodiments, priority may be given to the second modem module 172. Alternatively, priority may be established dynamically. The process will be described for the case where the first modem module 171 is initially coupled to the first antenna 101. Accordingly, the first antenna will be referred to as "primary" and the second antenna as "alternate." Other combinations of priority/second modem modules and primary/alternate antennas operate in a like manner.

The process of FIG. 2 attempts to control antenna switching to improve operation of the priority modem. The process may be performed repeatedly, for example, every 100 ms.

In step 210, the process determines whether the performance of the priority modem is less than a threshold. The process may use various metrics as the performance measure. A combination of metrics may also be used. Example metrics include: received signal level, RXLEV (e.g., for GSM); received signal code power, RSCP (e.g., for WCDMA, CDMA 1x, or TD-SCDMA); received signal reference power, RSRP (e.g., for LTE); and received signal strength indicator, RSSI. When the performance of the priority modem is less than the threshold, the process continues to step 220; otherwise, the process returns. The threshold may be set to a level that corresponds to modestly degraded performance. The threshold may also be set so as to avoid performing measurements (e.g., in step 220) that are unlikely to result in antenna switching. The performance measurement of step 210 can be considered to be a performance measure of demodulating the signal received by the priority modem according to the protocol used by the priority modem.

In step 220, the process measures how well the priority modem would perform if antenna switching was performed. The second receive path (e.g., the second RF receiver circuit 134) is reconfigured (if not already configured) to receive signals according to the protocol used by the first modem module 171. For example, the center frequency and bandwidth of tuner circuits may be reconfigured. The mirror module 182 can then measure performance for the protocol of the first (priority) modem module 171. Since the mirror module 182 is evaluating signals received via the second (alternate) antenna 102, its performance measurement is an indication of how the priority modem would perform if the antennas were switched. The mirror module 182 may also be used to provide measurements for inter-radio access technology (inter-RAT) handovers. Further, the times during which process measures how the priority modem would perform if antenna switching was performed may be chosen to reduce the impact of the measurements on communications provided by the second modem module 172. The performance measurement of step 220 can be considered to be a performance measure of demodulating the signal received by the second modem according to the protocol used by the priority modem.

In step 230, the process determines whether performance of the priority modem would be improved by switching to the alternate antenna. The determination may be made, tbr example, by comparing the performance measurement made by the mirror module 182 of the second modem module 172 with a corresponding performance measurement made by the first modem module 171. The comparison may include an offset so that small measurement differences do not result in antenna switching. When the performance would be improved by switching antennas, the process continues to step 240; otherwise, the process returns.

In step 240, the process switches the antenna used by the priority modem. In the described example, the process may switch the RF switch 105 so that the first (priority) modem module 171 changes from using first (primary) antenna 101 to using the second (alternate) antenna 102. Thus, the process of FIG. 2 determines that performance of the priority modem would be improved before switching the priority modem to use the alternative antenna.

Since the switching is performed after evaluation of the expected resulting performance, the threshold used in step 210 can be for a higher performance level than may otherwise be used. Accordingly, performance may be improved in case of modestly degraded service. Further, interruptions to communications caused by antenna switching that does not improve performance are avoided.

The process may be modified by adding, omitting, reordering, or altering steps. For example, in an embodiment, step 210 may be omitted so that evaluation of performance using the alternative antenna is performed without regard to the performance using the primary antenna.

Figure 3:
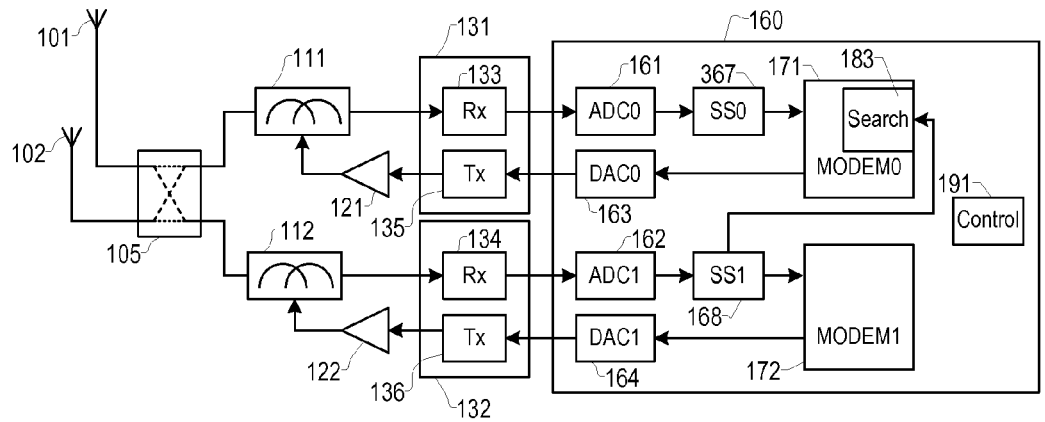
FIG. 3 is functional block diagram of another wireless terminal according to a presently disclosed embodiment.

FIG. 3 is functional block diagram of another wireless terminal according to a presently disclosed embodiment. The wireless terminal of FIG. 3 is similar to the wireless terminal of FIG. 1 with its functional elements operating as described in connection with FIG. 1 unless otherwise noted. Accordingly, the description will focus on differences in the two wireless terminals.

The wireless terminal of FIG. 3 includes a search module 183 in the first modem module 171. The search module 183 can be used to evaluate signals from the alternate antenna. The second sample buffer 168 may provide a block of saved samples to the search module 183. The block of saved samples is received using the alternate antenna. The search module 183 may also be used to evaluate other signals, for example, signal from base stations that are not currently serving the wireless terminal. Information from the evaluations may be used, for example, in handover decisions.

The evaluation of the signals from the alternate antenna provides a performance measure of how well the first modem module 171 is expected to perform if the antennas were switched. By comparing this performance measure with a corresponding performance measure from the receive signal processing of the first modem module 171, the wireless terminal can determine whether to switch antennas based on the expected resulting performance.

Figure 4:
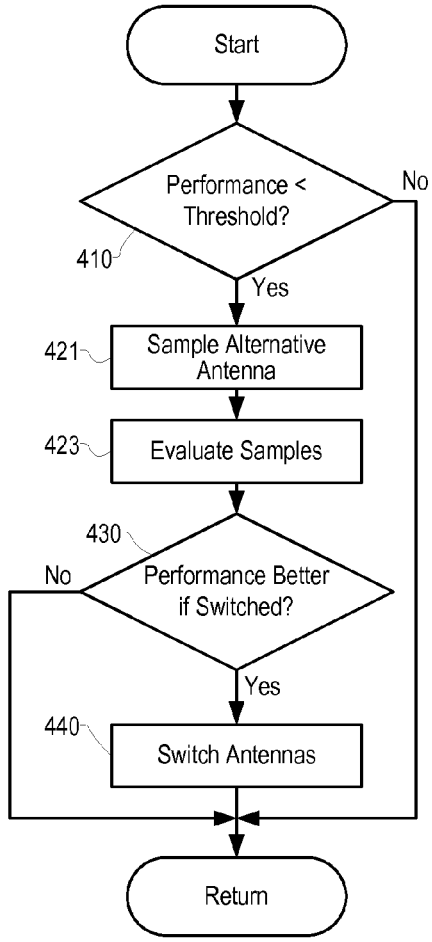
FIG. 4 is a flowchart of another process for antenna selection in a dual-radio device according to a presently disclosed embodiment.

FIG. 4 is a flowchart of a process for antenna selection in a dual-radio device. The process may be carried out, for example, by the wireless terminal of FIG. 3. To provide a specific example, the process will be described with reference to the wireless terminal of FIG. 3. The process is similar to the process of FIG. 2, but the process of FIG. 4 makes use of the search module 183.

The first modem module 171, in an example embodiment, has priority. In other embodiments, priority may be given to the second modem module 172. Priority may also be dynamically established. The process will be described for the case where the first modem module 171 is initially coupled to the first antenna 101. Accordingly, the first antenna will be referred to as "primary" and the second antenna as "alternate." Other combinations of priority/second modems and primary/alternate antennas operate in a like manner.

The process attempts to control antenna switching to improve operation of the priority modem. The process may be performed repeatedly, for example, every 100 ms.

In step 410, the process determines whether the performance of the priority modem is less than a threshold. In various embodiments, step 410 is the same or similar to step 210 of the process of FIG. 2. When the performance of the priority modem is less than the threshold, the process continues to step 421; otherwise, the process returns.

In step 421, the process collects samples received using the alternate antenna. The samples can be collected and stored in the second sample buffer 168. The second receive path (e.g., the second RF receiver circuit 134) is reconfigured (if not already configured) to receive signals according to the protocol used by the first modem module 171. For example, the center frequency and bandwidth of tuner circuits may be reconfigured. Although reconfiguring the second receive path may interfere with operation of the second modem module 172, the timing of the reconfiguring may be chosen to reduce the impact on communications provided by the second modem module 172. For example, the timing may be chosen to be when the second modem module 172 is in a sleep state or when any lost data would be automatically recovered.

In step 423, the process evaluates the collected samples from step 421. The search module 183 can receive the stored samples from the second sample buffer 168. The search module 183 determines a performance measure for the collected samples. Since the search module 183 is evaluating signals received via the alternate antenna, the performance measure is an indication of how well the priority modem would perform if the antennas were switched.

In step 430, the process determines whether performance of the priority modem would be improved by switching to the alternate antenna. The determination may be made, for example, by comparing the performance measurement made by the search module 183 with a corresponding performance measurement made by the receive processing of the first (priority) modem module 171. The comparison may include an offset so that small measurement differences do not result in antenna switching. When the performance would be improved by switching antennas, the process continues to step 440; otherwise, the process returns.

In step 440, the process switches the antenna used by the priority modem. In various embodiments, step 440 is the same or similar to step 240 of the process of FIG. 2.

Since the switching is performed after evaluation of the expected resulting performance, the threshold used in step 410 can be for a higher performance level than may otherwise be used. Accordingly, performance may be improved in case of modestly degraded service. Further, interruptions to communications caused by antenna switching that does not improve performance are avoided.

The process may be modified by adding, omitting, reordering, or altering steps. For example, in an embodiment, step 410 may be omitted so that evaluation of performance using the alternative antenna is performed without regard to the performance using the primary antenna.

Although particular embodiments are described above, many variations are possible including those with a different number of antennas, with a different number of modems, or with mismatched numbers of antennas and modems. Additionally, features of the various embodiments may be combined in combinations that differ from those described above.

Those of skill will appreciate that the various illustrative blocks and modules described in connection with the embodiments disclosed herein can be implemented in various forms. Some blocks and modules have been described above generally in terms of their functionality. How such functionality is implemented depends upon the design constraints imposed on an overall system. Various blocks, modules, and steps described in connection with the embodiments disclosed herein can often be implemented as electronic hardware, computer software, or combinations of both. Skilled persons can implement the described functionality in varying ways for each particular application, but such implementation decisions should not be interpreted as causing a departure from the scope of the invention. In addition, the grouping of functions within a module, block, or step is for ease of description. Specific functions or steps can be moved from one module or block without departing from the invention.

The various illustrative blocks and modules described in connection with the embodiments disclosed herein can be implemented in or with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Circuits implementing the embodiments described herein can be realized using various transistor types, logic families, and design methodologies. Additionally, an embodiment may use instructions stored in a memory. For example, a processor may read and execute instructions from a memory to perform various functions. The memory may be a non-transitory computer readable medium.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A wireless terminal including a circuit for controlling antenna switching in the wireless terminal, the circuit comprising:
    a first modem module configured to demodulate a first received signal according to a first protocol and to determine a first performance measure of demodulating the first received signal according to the first protocol using a first antenna;
    a second modem module configured to demodulate a second received signal according to a second protocol using a second antenna, the second modem module further comprising a mirror module operable to determine a second performance measure of demodulating the first received signal according to the first protocol using the second antenna; and
    a control module configured to:
        control a receive path between the second antenna and the second modem module to receive the first received signal,
        cause the mirror module of the second modem module to determine the second performance measure of demodulating the first received signal according to the first protocol using the second antenna, and
        cause a switch of the first antenna and the second antenna so that the first received signal is received using the second antenna and the second received signal is received using the first antenna in response to determining that the second performance measure is greater than the first performance measure.

2. The wireless terminal of claim 1, wherein the control module is further configured to control the receive path between the second antenna and the second modem module to receive signals according to the first protocol at times chosen based on an impact on communications provided by the second modem module.

3. The wireless terminal of claim 1, wherein the mirror module is further configured to provide measurements for inter-radio access technology handovers.

4. The wireless terminal of claim 1, wherein the control module is further configured to:
compare the first performance measure to a threshold, and
in response to determining that the first performance measure is less than the threshold,
control the receive path between the second antenna and the second modem module to receive the first received signal,
cause the mirror module of the second modem module to determine the second performance measure, and
cause the switch of the first antenna and the second antenna so that the first received signal is received using the second antenna and the second received signal is received using the first antenna in response to determining that the second performance measure is greater than the first performance measure.

5. The wireless terminal of claim 4, wherein the control module is further configured to cause no switch of the first antenna and the second antenna so that the first received signal is received using the first antenna and the second received signal is received using the second antenna in response to determining that the second performance measure is less than or equal to the first performance measure.

6. The wireless terminal of claim 1, further comprises:
a radio frequency (RF) switch coupled to the first antenna and the second antenna; and
wherein the control module is configured to control the RF switch so that the first received signal is received using the second antenna and the second received signal is received using the first antenna in response to determining that the second performance measure exceeds the first performance measure.

7. A wireless terminal including a circuit for controlling antenna switching in the wireless terminal, the circuit comprising:
means for demodulating a first received signal according to a first protocol and for determining a first performance measure of demodulating the first received signal according to the first protocol using a first antenna;
means for demodulating a second received signal according to a second protocol using a second antenna, the means for demodulating the second received signal further comprising means for determining a second performance measure of demodulating the first received signal according to the first protocol using the second antenna; and
means for controlling operation of the wireless terminal including:
means for controlling a receive path between the second antenna and the means for demodulating the second received signal to receive the first received signal,
means for causing the means for determining the second performance measure to determine the second performance measure of demodulating the first received signal according to the first protocol using the second antenna, and
means for causing a switch of the first antenna and the second antenna so that the first received signal is received using the second antenna and the second received signal is received using the first antenna in response to determining that the second performance measure is greater than the first performance measure.

8. The wireless terminal of claim 7, wherein the means for controlling operation of the wireless terminal further includes means for controlling the receive path between the second antenna and the means for demodulating the second received signal to receive signals according to the first protocol at times chosen based on an impact on communications provided by the means for demodulating the second received signal.

9. The wireless terminal of claim 7, wherein the means for determining the second performance measure is further configured to provide measurements for inter-radio access technology handovers.

10. The wireless terminal of claim 7, wherein the means for controlling operation of the wireless terminal further includes means for comparing the first performance measure to a threshold, means for causing the mirror module to determine the second performance measure after determining that the first performance measure is less than the threshold, and means for comparing the second performance measure to the first performance measure.

11. A method for controlling antenna switching in a wireless terminal, comprising:
demodulating, by a first modem module of the wireless terminal, a first received signal according to a first protocol received using a first antenna;
determining, by the first modem module, a first performance measure of demodulating the first received signal according to the first protocol received using the first antenna;
demodulating, by a second modem module of the wireless terminal, a second received signal according to a second protocol received using a second antenna, wherein the second modem module further comprises a mirror module operable to determine a second performance measure of demodulating the first received signal according to the first protocol using the second antenna;
controlling, by a control module of the wireless terminal, a receive path between the second antenna and the second modem module to receive the first received signal;
causing, by the control module, the mirror module of the second modem module to determine the second performance measure of demodulating the first receive signal using the second antenna; and
causing, by the control module, a switch of the first antenna and the second antenna so that the first received signal is received using the second antenna and the second received signal is received using the first antenna in response to determining that the second performance measure is greater than the first performance measure.

* * * * *